United States Patent
Meinders et al.

(10) Patent No.: US 7,916,617 B2
(45) Date of Patent: Mar. 29, 2011

(54) RECOGNIZABLE PATTERNS IN ADJACENT TRACKS OF ROM RECORD CARRIERS FOR SIMULTANEOUS SCANNING FOR COPY PROTECTION

(75) Inventors: Erwin Rinaldo Meinders, Eindhoven (NL); Jacobus Hermanus Maria Neijzen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1116 days.

(21) Appl. No.: 11/569,765

(22) PCT Filed: May 30, 2005

(86) PCT No.: PCT/IB2005/051756
§ 371 (c)(1),
(2), (4) Date: Nov. 29, 2006

(87) PCT Pub. No.: WO2005/119664
PCT Pub. Date: Dec. 15, 2005

(65) Prior Publication Data
US 2008/0279086 A1 Nov. 13, 2008

(30) Foreign Application Priority Data
Jun. 3, 2004 (EP) .................................... 04102485

(51) Int. Cl.
*G11B 7/24* (2006.01)
(52) U.S. Cl. .................................................. 369/275.4
(58) Field of Classification Search ............... 369/275.3, 369/275.4, 275.1, 275.2, 44.26, 44.37, 44.38, 369/120, 112.21, 44.11, 112.01, 124.02, 369/44.36
See application file for complete search history.

(56) References Cited

U.S. PATENT DOCUMENTS

| | | | | |
|---|---|---|---|---|
| 5,081,617 A * | 1/1992 | Gelbart | | 369/112.24 |
| 5,084,858 A * | 1/1992 | Maeda | | 369/53.33 |
| 5,153,872 A * | 10/1992 | Maeda | | 369/124.09 |
| 5,224,082 A * | 6/1993 | Kurokawa et al. | | 369/44.23 |
| 5,291,471 A * | 3/1994 | Russell | | 369/109.02 |
| 5,355,361 A * | 10/1994 | Maeda | | 369/120 |
| 5,416,766 A * | 5/1995 | Horimai | | 369/116 |
| 5,666,340 A * | 9/1997 | Maeda | | 369/53.22 |
| 5,684,783 A * | 11/1997 | Horimai et al. | | 369/124.02 |
| 6,567,368 B1 * | 5/2003 | Kim | | 369/124.02 |
| 7,177,262 B2 * | 2/2007 | Kondo et al. | | 369/275.4 |
| 2009/0097376 A1 * | 4/2009 | Yamaoka et al. | | 369/275.1 |

FOREIGN PATENT DOCUMENTS

| | | |
|---|---|---|
| EP | 0545472 A1 | 6/1993 |
| EP | 0545472 B1 | 6/1993 |
| EP | 0545526 A1 | 6/1993 |
| EP | 0545526 B1 | 6/1993 |
| EP | 0637023 A1 | 2/1995 |
| EP | 0637023 B1 | 2/1995 |
| JP | 58029154 A | 2/1983 |
| JP | 03260914 A | 11/1991 |
| WO | 0186650 A1 | 11/2001 |
| WO | 2004059646 A1 | 7/2004 |

* cited by examiner

Primary Examiner — Tan X Dinh

(57) ABSTRACT

In order to distinguish a duplicated record carrier from an original record carrier, a pattern is included in a ROM type record carrier. The pattern is oriented perpendicular to the reading direction of the record carrier. During illegal duplication the spatial relationship is disturb which can be easily detected. The patterns can be read out simultaneously by the same single read-out spot by including both patterns within the diameter of the optical spot, thus guaranteeing that the read-out patterns are actually still spatially close together.

10 Claims, 6 Drawing Sheets

RECOGNIZABLE PATTERNS IN ADJACENT TRACKS OF ROM RECORD CARRIERS FOR SIMULTANEOUS SCANNING FOR COPY PROTECTION

The invention relates to a record carrier comprising marks for recording information and a record carrier identification recorded using at a first pattern comprising at least one mark and a second pattern comprising at least one mark, and to a playback device comprising a read-out means for retrieving marks recorded on a record carrier and a record carrier identification detection means.

Such a device is known from EP 0545472 where a copy right control system is disclosed that uses a first pattern and a second pattern recorded on the record carrier for identifying the record carrier and thus allowing the control of the copy right of the content of the record carrier. The first pattern has a different length of the marks than the second pattern. When a regular playback is used the data stored in these marks is retrieved and during the retrieval the information about the length of the marks is lost due to reclocking. The recorder can access the mark length information before the reclocking occurs and can thus retrieve the information thus stored.

Such a record carrier has the drawback that it can still be copied if the reclocking can be avoided.

It is an objective of the present invention to provide a record carrier that cannot be copied by simply avoiding the reclocking of the data during data retrieval.

In order to achieve this objective the record carrier according to the invention is characterized in that the first pattern and the second pattern are located such that marks of the second pattern can be read simultaneous together with marks of the first pattern by a single read-out spot.

If patterns are to be read out simultaneously by the same single read-out spot the patterns have to be both within the diameter of the optical spot, i.e. they are spatially close together and their relative position is of high importance.

A duplication operation copying the data from one record carrier to another record carrier may avoid reclocking but it cannot guarantee the exact position of the data on the target record carrier to be identical to the source record carrier. Slight changes in the spacing of the tracks will result in a shift of the patterns of marks relative to each other. Such a change of relative position can easily be detected when read-out is performed with a single optical spot because the pattern are no longer covered by the single optical spot simultaneously. The record carrier can thus be identified as an illegal copy. The objective of the invention is consequently achieved.

An embodiment of the record carrier is characterized in that the first pattern is located in a first track and the second pattern is located on a second track directly adjacent to the first track.

The optical spot can be enlarged or the track pitch reduced so that two adjacent tracks can be covered by the optical spot allowing the simultaneous read-out of adjacent patterns in the two tracks.

A further embodiment of the record carrier is characterized in that the first track and the second track are part of a spiral.

Often record carriers have one or more spirals where the patterns are stored. Due to the nature of the sequential writing of a spiral any change in pitch of the spiral or length of the marks on the spiral will lead to an offset of the marks when copying the marks from the spiral or spirals on the source record carrier to the spiral or spirals on the target record carrier. Consequently a record carrier having spiral tracks is very suitable for the present invention.

A further embodiment of the record carrier is characterized in that the first track and the second track are part of the same spiral.

When the pattern are stored on the same spiral any change in pitch or mark length, due to copying, will result in an offset between the patterns. A duplicated record carrier can thus be identified.

A further embodiment of the record carrier is characterized in that the record carrier identification comprises a third pattern and that the third pattern is located on a third track directly adjacent to the first track.

By including a third pattern on a third track adjacent to the first track the offset resulting from a duplication will be even more obvious and detectable since both the second and third pattern will be offset compared to the first pattern.

A further embodiment of the record carrier is characterized in that first pattern and the second pattern and the third pattern are aligned in a direction perpendicular to a reading direction.

By aligning the three patterns to line up in a direction perpendicular to the reading direction a duplication will result in a loss of alignment between the patterns which can be easily detected.

A further embodiment of the record carrier is characterized in that the second pattern and the third pattern are identical.

By having the second and third pattern identical the detection of these special, aligned, patterns is simplified. In the regular data section of the record carrier it is unlikely that these special patterns occur, being identical and aligned. Consequently detection is simplified.

A further embodiment of the record carrier is characterized in that the marks are length modulated and that the first pattern uses a first mark length hat the second pattern and the third pattern uses a second mark length different from the first mark length.

By using specific combinations of mark length data can be encoded. Each combination represents a value. The chance that these combinations of three patterns occur in an aligned fashion on the record carrier is low so that the detection of the record carrier identification information encoded using these combinations is not disturbed by regular data on the record carrier.

A further embodiment of the record carrier is characterized in that the record carrier identification is recorded using a first combination of the first pattern, the second pattern and the third pattern, where the first pattern uses the first mark length and the second pattern and the third pattern uses the second mark length, and a second combination of the first pattern, the second pattern and the third pattern where the first pattern uses a second mark length and the second pattern and the third pattern uses the first mark length.

This creates complementary combinations, i.e. the mark length for the patterns on the two adjacent tracks of one combination is used for the pattern on the center track of the other combination. This means that the detection, reading these areas with a single read-out spot will encounter two distinct patterns and reflection levels. The first combination represents for instance a '0' while the second combination represents a '1'. A sequence of these combinations of patterns on three adjacent tracks can thus be used to store record carrier identification information that will be destroyed as soon as the record carrier is duplicated.

A playback device according to the invention is characterized in that the read-out means are arranged to project an optical spot simultaneously on the record carrier covering a first pattern comprising at least a one mark and a second pattern comprising at least one mark.

A playback device that needs to retrieve record carrier identification data from the record carrier in order to determine whether the record carrier is an original or an illegal copy needs to be sure that the information read is reliably indicating an original record carrier.

If patterns are to be read out simultaneously by the same single read-out spot the patterns have to be both within the diameter of the optical spot, i.e. they are spatially close together and their relative position is of high importance.

A duplication operation copying the data from one record carrier to another record carrier may avoid reclocking but it cannot guarantee the exact position of the data on the target record carrier to be identical to the source record carrier. Slight changes in the spacing of the tracks will result in a shift of the patterns of marks relative to each other. Such a change of relative position can easily be detected when read-out is performed with a single optical spot because the pattern are no longer covered by the single optical spot simultaneously. The record carrier can thus be identified as an illegal copy. If the patterns are covered by the single spot the play back device can retrieve the data as expected and the playback device can declare the record carrier to be an original record carrier. The objective of the invention is consequently achieved.

An embodiment of the playback device is characterized in that the read-out means is arranged to project the optical spot on a first track and a second adjacent track simultaneously, covering a section of the first pattern located on the first track and a section of the second pattern located on the second track.

Since the optical spot moves in the reading direction it is not required to cover the one or both patterns entirely with the optical spot. A sequential read-out is adequate to retrieve the record carrier identification.

A further embodiment of the playback device is characterized in that the read-out means is arranged to project the optical spot on a first track and a second adjacent track and a third adjacent track simultaneously, covering a section of the first pattern located on the first track and a section of the second pattern located on the second track and a section of a third pattern on the third track.

By including a third pattern on a third track adjacent to the first track in the read-out the offset resulting from a duplication will be even more obvious and detectable since both the second and third pattern will be offset compared to the first pattern. The read-out spot is centered on the first track and the edges of the read-out spot also cover the two adjacent tracks, i.e. the second and the third track.

A further embodiment of the playback device is characterized in that the record carrier identification retrieval means is arranged to retrieve the record carrier identification from a combination of the first pattern and the second pattern and the third pattern occurring adjacently where the second pattern and the third pattern are identical.

By retrieving the record carrier identification from a combination where the second and third pattern are identical the detection of these special, aligned, patterns is simplified. In the regular data section of the record carrier it is unlikely that these special patterns occur, being identical and aligned. Consequently detection is simplified.

A further embodiment of the playback device is characterized in that the record carrier identification retrieval means is arranged to retrieve the record carrier identification from a first combination of the first pattern, the second pattern and the third pattern, where the first pattern uses a first mark length and the second pattern and the third pattern use a second mark length, and a second combination of the first pattern, the second pattern and the third pattern where the first pattern uses the second mark length and the second pattern and the third pattern use the first mark length.

By retrieving the record carrier identification from complementary combinations, i.e. where the mark length for the patterns on the two adjacent tracks of one combination is used for the pattern on the center track of the other combination. This means that the detection, reading these areas with a single read-out spot will encounter two distinct patterns and reflection levels. The first combination represents for instance a '0' while the second combination represents a '1'. A sequence of these combinations of patterns on three adjacent tracks can thus be used to store record carrier identification information that will be destroyed as soon as the record carrier is duplicated.

If multiple readout spots are used, e.g. with a two-dimensional record carrier, for detection of a two-dimensional data pattern, this readout concept can also be used to retrieve a two-dimensional copy protection key. In a rudimental embodiment of a multiple spots readout device, a satellite spot placed off-axis of the central spot may be used to measure the data pattern in the adjacent tracks.

The invention will now be described based on figures.

Figure 1:
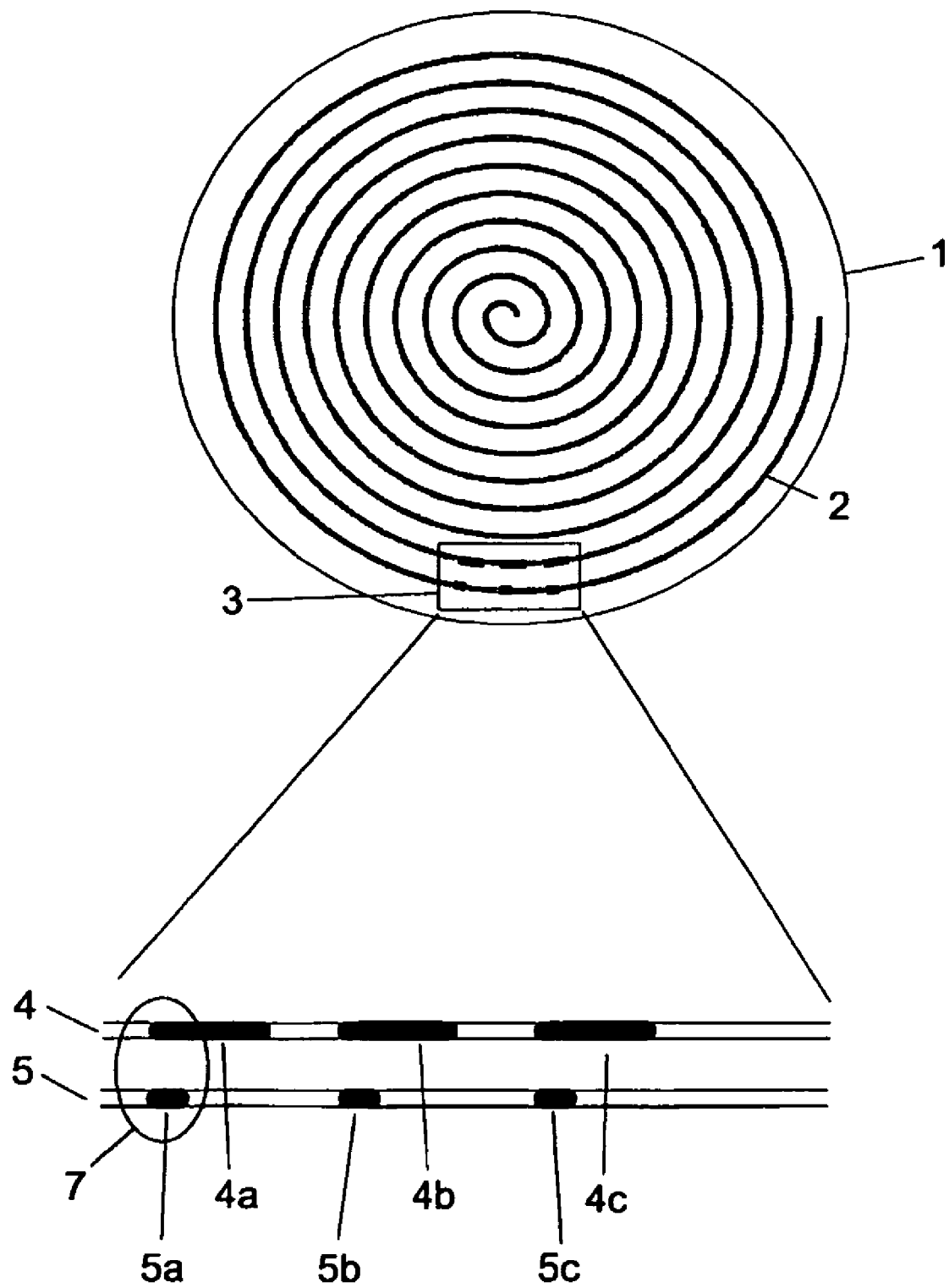
FIG. 1 shows an optical spot and a section of a record carrier comprising patterns in two adjacent tracks.

The record carrier 1 comprises a spiral 2 comprising tracks 4, 5 where marks 4a, 4b, 4c, 5a, 5b, 5c are recorded. The first track 4 comprises a pattern of marks 4a, 4b, 4c. The second track 5 comprises a pattern of marks 5a, 5b, 5c.

An optical spot 7 that can read sections of the first track 4 and the second track 5 simultaneously is indicated by a circle.

The reading direction in FIG. 1, when the record carrier 1 is read from the center to the outside, is from left to right in the enlarged section showing the two tracks 4, 5.

The alignment of the pattern can be detected without having to provide for a spatial synchronization as would be required when the optical spot 7 would only cover a single track. The first pattern and the second pattern is shown in an aligned state, which makes it easier to detect any offset introduced by a copying process, but as long as the spatial relation between the first pattern and the second pattern is know the two patterns do not need to be aligned on the original since the changes in spatial relationship between the first and second pattern indicate that the record carrier is a duplicate instead of an original record carrier.

Also, for clarity, the individual marks are shown to be aligned even though this is not required for the invention to work. The marks are only shown aligned in order to clearly show the effect of the duplication on the relative positions of the mark in FIG. 3 when the track pitch is different between source record carrier and target record carrier.

Figure 2:
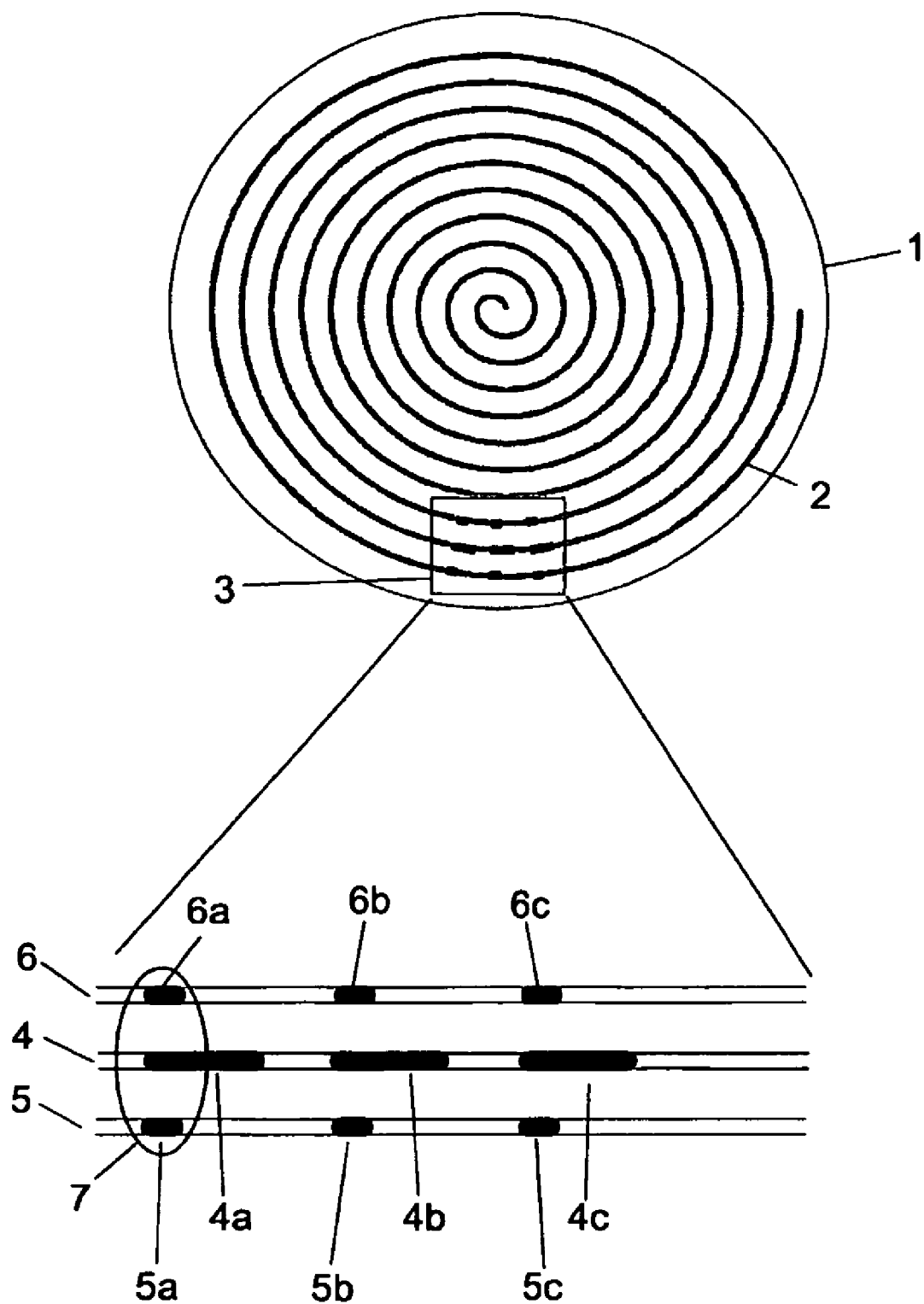
FIG. 2 shows an optical spot and a section of a record carrier comprising patterns in three adjacent tracks.

FIG. 2 shows an optical spot and a section of a record carrier comprising patterns in three adjacent tracks.

The record carrier 1 comprises a spiral 2 comprising tracks 4, 5, 6 where marks 4a, 4b, 4c, 5a, 5b, 5c, 6a, 6b, 6c are recorded. The first track 4 comprises a pattern of marks 4a, 4b, 4c. The second track 5 comprises a pattern of marks 5a, 5b, 5c. The third track 6 comprises a pattern of marks 6a, 6b, 6c.

An optical spot 7 that can read sections of the first track 4 and the second track 5 and the third track 6 simultaneously is indicated by a circle.

The reading direction in FIG. 2, when the record carrier 1 is read from the center to the outside, is from left to right in the enlarged section showing the three tracks 4, 5, 6.

The alignment of the pattern can be detected without having to provide for a spatial synchronization as would be required when the optical spot 7 would only cover a single track. The first pattern, the second pattern and third pattern are shown in an aligned state, which makes it easier to detect any offset introduced by a copying process, but as long as the spatial relation between the first pattern, the second pattern and third pattern is know the three patterns do not need to be aligned on the original since the changes in spatial relationship between the first pattern, second pattern and third pattern indicate that the record carrier is a duplicate instead of an original record carrier.

Also, for clarity, the individual marks are shown to be aligned even though this is not required for the invention to work. The marks are only shown aligned in order to clearly show the effect of the duplication on the relative positions of the mark in FIG. 4 when the track pitch is different between source record carrier and target record carrier.

Figure 3:
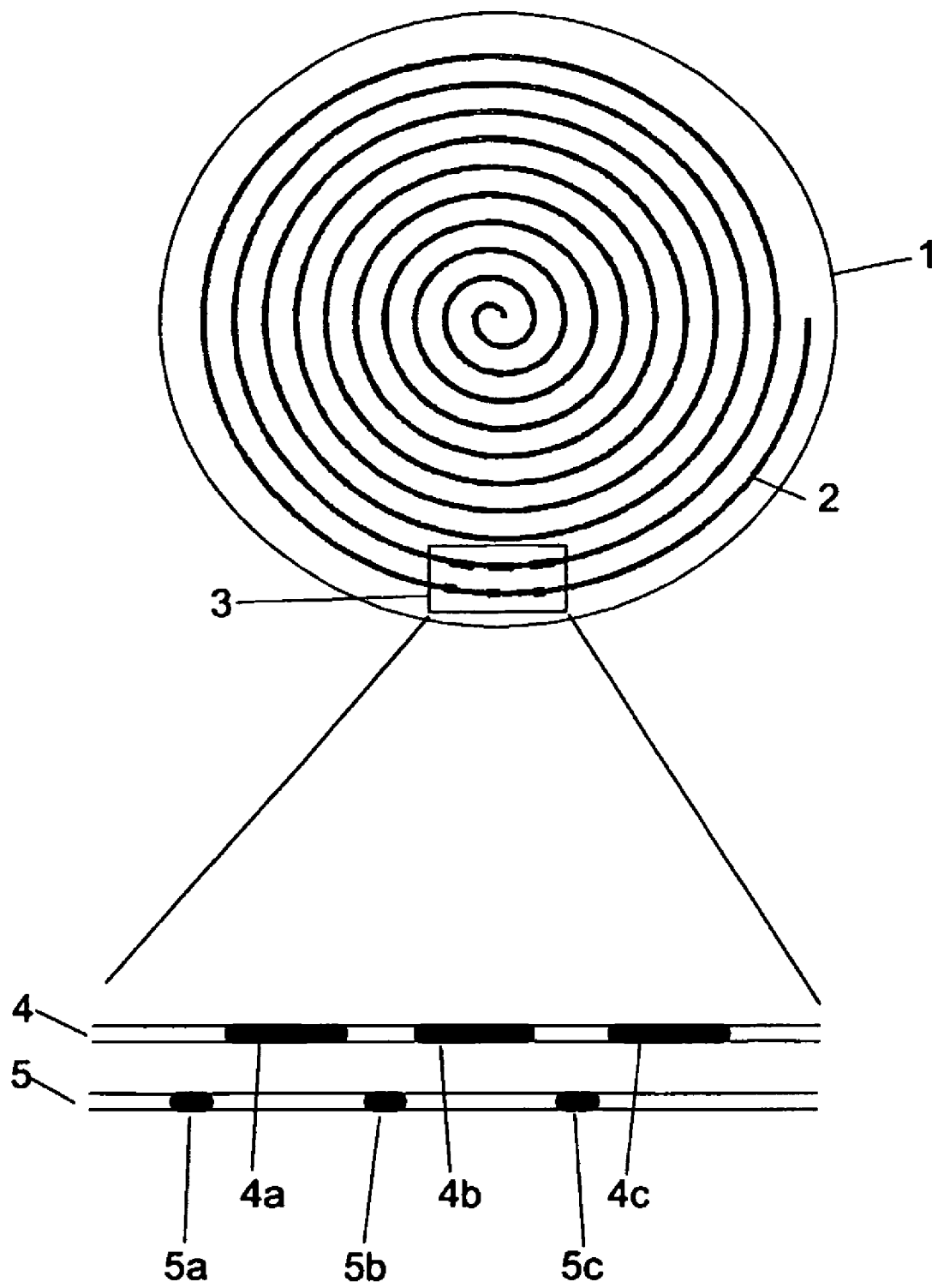
FIG. 3 shows the effect of duplication on patterns in two adjacent tracks.

FIG. 3 shows the effect of duplication on patterns in two adjacent tracks. When the pitch of the spiral 2 of the target record carrier 8 differs from the source record carrier 1 patterns that were aligned on the original record carrier will no longer be aligned when copied to the target record carrier. As can be seen from FIG. 4 the marks 5a, 5b, 5c of the second pattern on the second track 5 on the target record carrier 8 are displaced relatively to the marks 4a, 4b, 4c of the first pattern on the first track 4 on the target record carrier. The displacement creates an offset between the patterns that can be detected, indicating that the record carrier is not the original record carrier.

Figure 4:
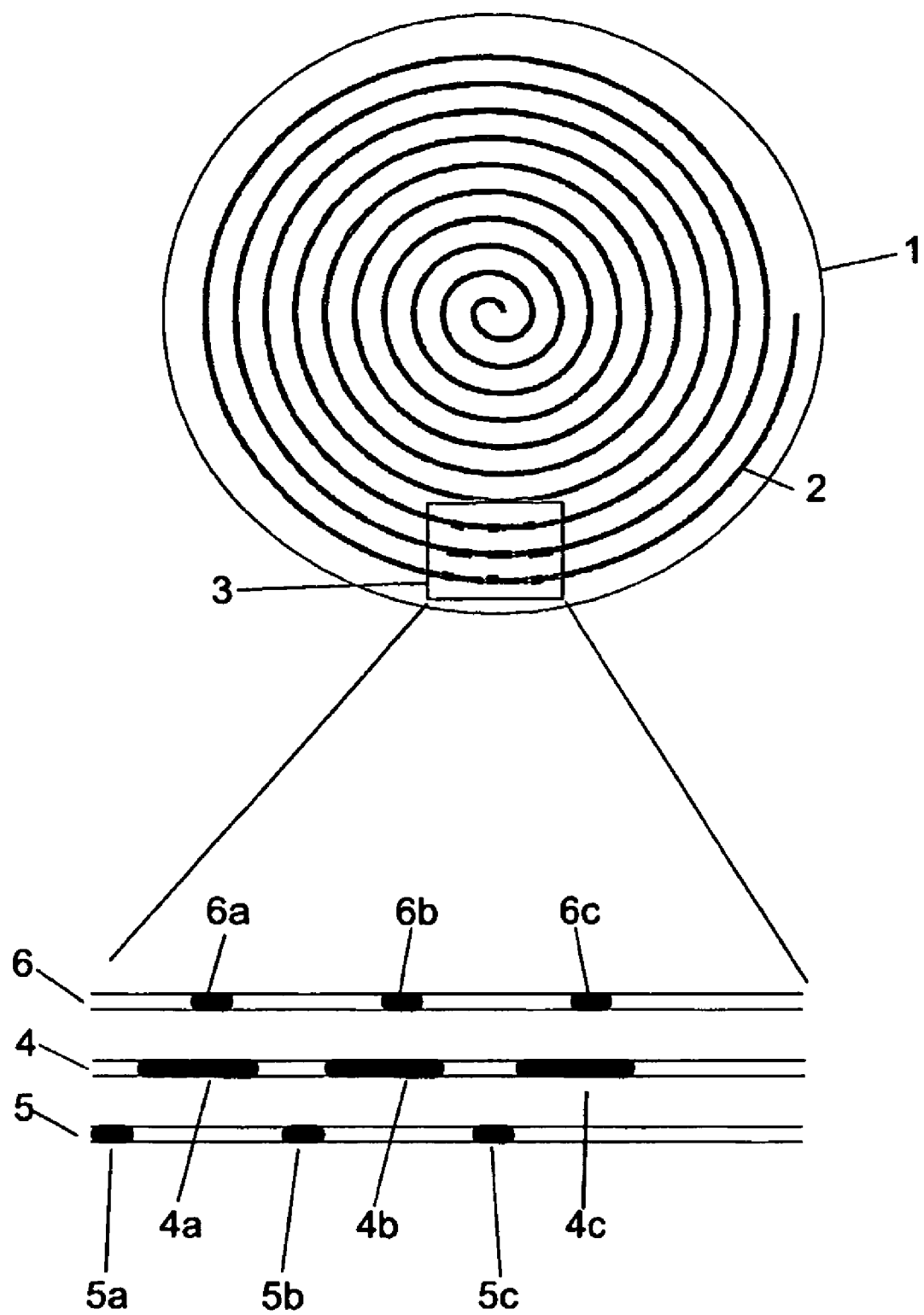
FIG. 4 shows the effect of duplication on patterns in three adjacent tracks.

FIG. 4 shows the effect of duplication on patterns in three adjacent tracks.

When the pitch of the spiral 2 of the target record carrier 8 differs from the source record carrier 1 patterns that were aligned on the original record carrier will no longer be aligned when copied to the target record carrier. As can be seen from FIG. 4 both the marks 5a, 5b, 5c of the second pattern on the second track 5 on the target record carrier 8 and the marks 6a, 6b, 6c of the third pattern on the third track 6 are displaced relatively to the marks 4a, 4b, 4c of the first pattern on the first track 4 on the target record carrier. The displacement creates an offset between the patterns that can be detected, indicating that the record carrier is not the original record carrier.

Figure 5:
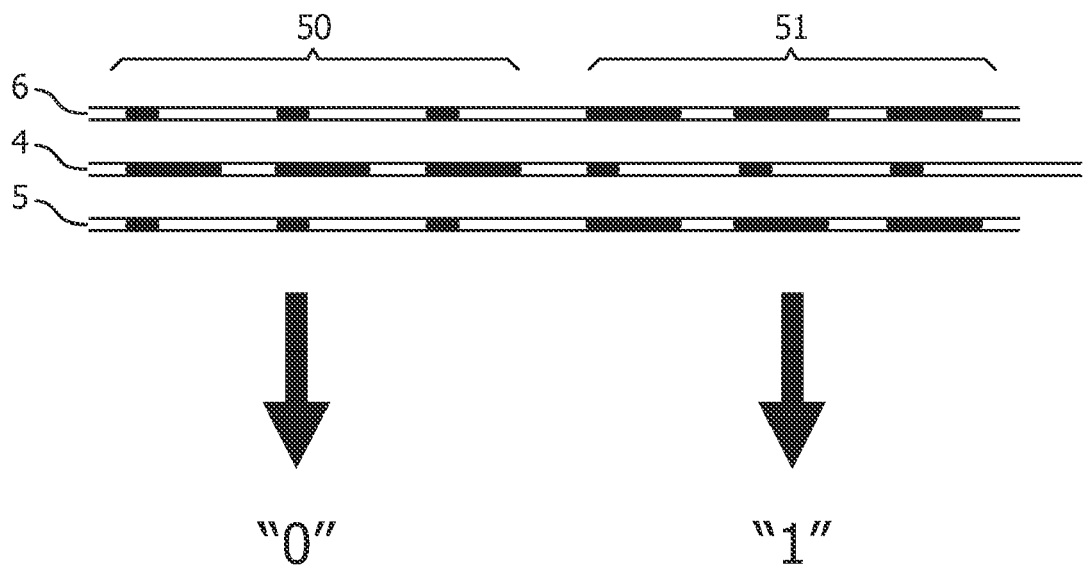
FIG. 5 shows a pattern in detail

FIG. 5 shows a pattern in detail

The first combination 50 comprises patterns that are positioned adjacent on three adjacent tracks 4, 5, 6. The first combination 50 comprises a first pattern on the first, center, track 4 with a first mark length and comprises a second pattern with a second mark length on both outer tracks 5,4, the second track 5 and the third track 6. The patterns on the outer tracks 4, 5 of the three tracks 4, 5, 6 are identical, simplifying the detection of these patterns, but can also differ while still allowing the invention to function properly. The first combination 50 corresponds to a value, for instance a binary "0".

The second combination 51 also comprises patterns that are positioned adjacent on three adjacent tracks 4, 5, 6. The second combination 51 comprises the second pattern with the second mark length on the first, center, track 4 and comprises the first pattern with the first mark length on both outer tracks 5,4, the second track 5 and the third track 6. The patterns on the outer tracks 4, 5 of the three tracks 4, 5, 6 are identical, simplifying the detection of these patterns, but can also differ while still allowing the invention to function properly. The second combination 51 corresponds to a value, for instance a binary "1".

Using these two combinations 50, 51 of patterns data can be stored on the original record carrier that will be altered by the duplication of the record carrier.

Thus, the proposed copy protection mark consists of lateral data patterns that exist by the favor of optical cross-talk. Consider for example a long I8 pit present in the central track 4. If perfectly aligned short I2 pits are written in the adjacent tracks 5, 6, we can consider this basic pattern as a '0'. Also a certain number of these basic patterns can be cascaded. A series of three I2 pits that are surrounded by perfectly aligned I8 pits can be considered as a basic '1' as shown in FIG. 5.

Another basic pattern may be an I8-I8 pattern, i.e. I8 pits with in between I8 lands, that is flanked by I2 pits or an I2-I2 pattern, i.e. I2 pits with in between I2 lands that is flanked by I8 pits. Other kind or basic patterns are also possible but the basic requirement is that the adjacent tracks are clearly detectable from the central aperture signal.

It is clear that even though the example shows differences in mark lengths, other implementations allowing a differentiation of the marks such as reflectivity modulation can be equally employed.

Figure 6:
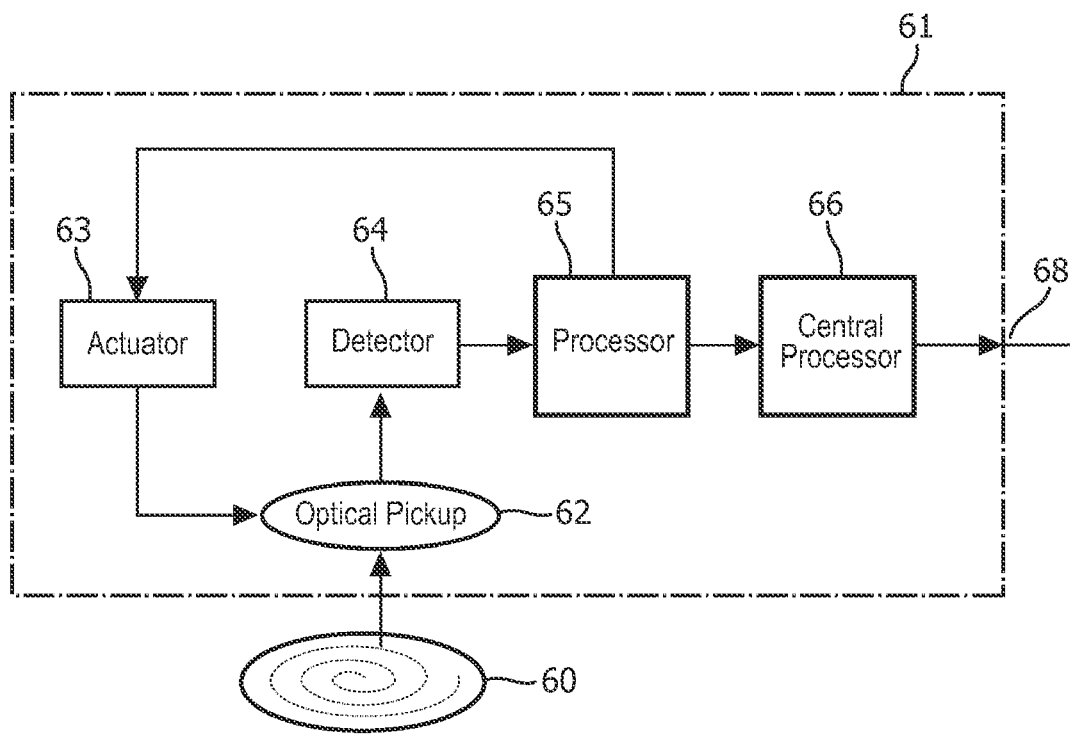
FIG. 6 show a playback device for retrieving the record carrier identification information.

FIG. 6 show a playback device for retrieving the record carrier identification information.

The playback device 61 for retrieving a record carrier identification from a record carrier 60 comprises an optical pickup device 62, schematically shown in FIG. 6 as the objective comprised in the optical pickup 62. A detector 64 processes the signal obtained from the optical pickup 62 and provides the resulting data to the processor 65 where this data is used to derive signals for the correct tracking and focus of the optical pickup 62. These control signals are then provided to the actuator means 63 that actually corrects the position of the objective of the optical pickup 62. The actuator 63 is integrated into the optical pickup 62 but is shown here separately because of its specific function. In order to read the combination of spatially correlated patterns of the present invention the processor 65 controls the actuator means 63 to track the central track of the three tracks and to focus the optical spot such that the optical spot not only covers the central track but also parts of the adjacent tracks such that the patterns on the adjacent tracks are read simultaneously. By processing the resulting signal from the optical pickup 62 the processor 65 can determine whether the patterns on the tracks are still correctly positioned relative to each other or have moved due to illegal duplication.

The processor 65 can also retrieve the information stored in the record carrier identification as explained in FIG. 5. The processor 65 subsequently provides the retrieved information to the central processor 66 of the playback device 61. Based on this information the central processor 66 can determine what the copy right status of the content on the record carrier 60 is and whether playback of the record carrier 60 is allowed. If playback is allowed the central processor provides the regular content of the record carrier 60 to the output 68 of the playback device 61.

Figure 7:
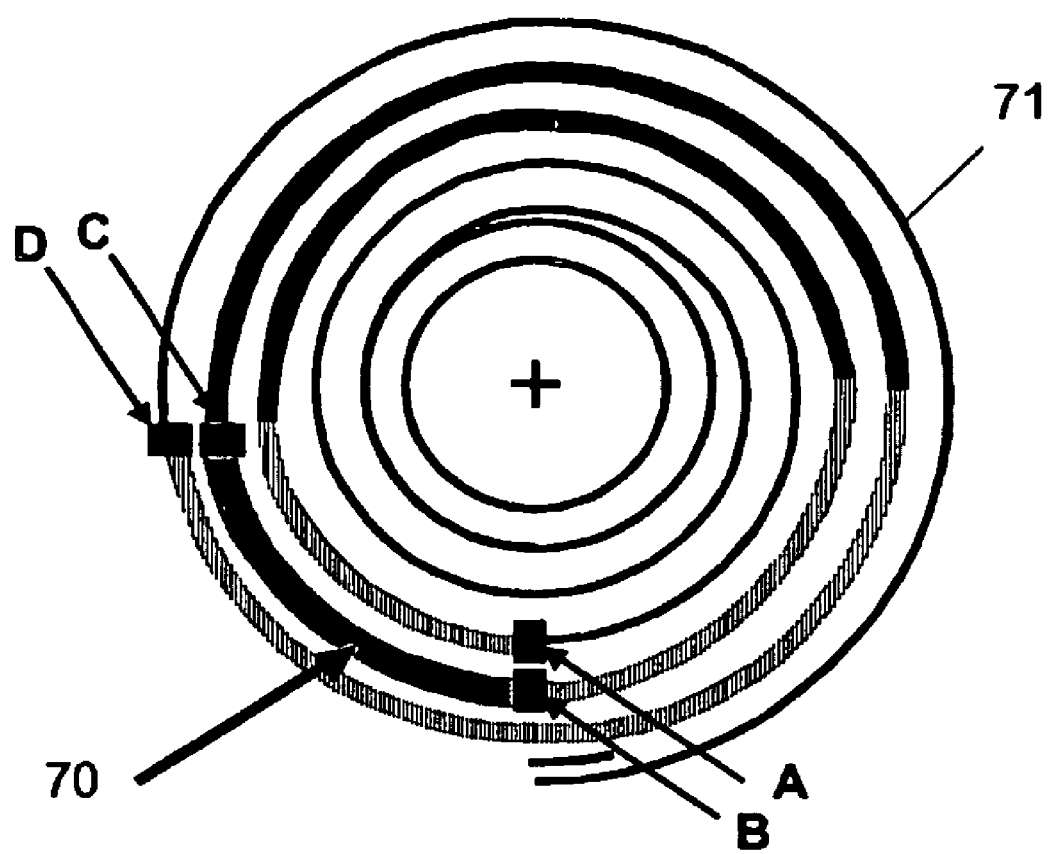
FIG. 7 show an embodiment for recording a key on a master for producing ROM discs.

FIG. 7 show an embodiment for recording a key on a master for producing ROM discs.

For the generation of the master disc from which the final, original record carrier is to be manufactured, the synchronisation of the rotation of the master disc and the modulation of the write beam is essential. If the tracks 71 are written in CAV mode (constant angular velocity), synchronisation of adjacent tracks is a fact. But the write pulses, or the clock, needs to be reduced with increasing radius since the linear velocity increases with increasing radius at constant angular velocity and the physical channel bit length should remain the same, e.g. 74.5 nm for 25 GB BD-ROM. Most mastering equipment operates at constant linear velocity, meaning that the synchronisation of adjacent tracks should be achieved by synchronising the disc rotation and light modulation (clock). Recent experiments have shown that synchronisation is possible with a very high spatial accuracy.

The complete disc is then written in CLV mode (Constant Linear Velocity) except the areas with synchronised data tracks, which are written in CAV mode. The rotation and translation speed and position needs to be well known to accurately switch between CAV mode and CLV mode. The synchronisation of tracks should last at least two revolutions plus the number of ECC blocks in which the ROM key according to the invention is scrambled. The synchronisation, achieved for example by writing in CAV mode, starts at address A and runs until address D. The section 70 of the central track in between addresses B and C is flanked by synchronized patterns in the two adjacent data tracks. The section of the track between address B and address C may contain 1 to several ECC blocks. The data pattern consists of the basic '1' i.e. a pattern of I2 pits flanked by synchronised I8 pits and '0' i.e. a pattern of I8 pits flanked by synchronised I2 pits.

The area where synchronization occurs, defined between addresses B and C may be chosen as long as needed, and may for example contain 100 ECC blocks. In that case, the synchronized area comprises several synchronized data tracks.

Reducing the track pitch is a possibility to further increase the data density of a ROM disc. Recent attempts with liquid immersion mastering showed that a track pitch of TP=270 nm an a Channel Bit Length of 60 nm (37 GB) lead to retrievable data (the symbol error rate was in the order of E-4) in case a Viterbi decoder was used in combination with BD readout optics. Because the optical cross track interference becomes worse for shorter track pitches, copy protection keys based on lateral cross-talk are in particular suited for high-density discs with a reduced track pitch. It is likely that future standards will be based on a reduced track pitch allowing the implementation of the present invention readily.

The track pitch can be even reduced to 200 nm and based on the physical properties of the focussed laser spot, the CBL can be reduced to 45-50 nm. The reduced track pitch means a significant increase of the optical cross talk, which may even further plead for a two-dimensional copy protection key.

The invention claimed is:

1. Record carrier comprising marks for recording information and a record carrier identification recorded using at a first pattern comprising at least one mark and a second pattern comprising at least one mark, and a third pattern, wherein at least the first pattern and the second pattern are located such that marks of the second pattern can be read simultaneous together with marks of the first pattern by a single read-out spot; and the first pattern and the second pattern are predetermined recognizable patterns in a predetermined positional relationship in the spiral direction whereby a deviation in the predetermined spiral relationship would be recognizable, wherein the first pattern is located in a first track and the second pattern is located on a second track directly adjacent to the first track; and the third pattern is located on a third track directly adjacent to the first track wherein first pattern and the second pattern and the third pattern are aligned in a direction perpendicular to a reading direction and the second pattern and the third pattern are identical.

2. Record carrier as claimed in claim 1,
wherein the first track and the second track are part of a spiral.

3. Record carrier as claimed in claim 2,
wherein the first track and the second track are part of the same spiral.

4. Record carrier as claimed in claim 1,
wherein the marks are length modulated and that the first pattern uses a first mark length hat the second pattern and the third pattern uses a second mark length different from the first mark length.

5. Record carrier as claimed in claim 4,
wherein the record carrier identification is recorded using a first combination of the first pattern, the second pattern and the third pattern, where the first pattern uses the first mark length and the second pattern and the third pattern uses the second mark length, and a second combination of the first pattern, the second pattern and the third pattern where the first pattern uses a second mark length and the second pattern and the third pattern uses the first mark length.

6. Playback device comprising a read-out means for retrieving marks recorded on a record carrier and a record carrier identification detection means,
wherein the read-out means is arranged to project an optical spot on the record carrier containing a first track, a second adjacent track and a third adjacent track, simultaneously covering a section of a first pattern located on the first track, a section of a second pattern located on the second track and a section of a third pattern on the third track, the first pattern comprising at least a one mark and the second pattern comprising at least one mark, wherein the first pattern and the second pattern are predetermined recognizable patterns in a predetermined positional relationship in the spiral direction, and
the record carrier identification retrieval means is arranged to retrieve the record carrier identification from a combination of the first pattern, the second pattern and the third pattern occurring adjacently where the second pattern and the third pattern are identical.

7. Playback device as claimed in claim 6, wherein the record carrier identification retrieval means is arranged to retrieve the record carrier identification from a first combination of the first pattern, the second pattern and the third pattern, where the first pattern uses a first mark length and the second pattern and the third pattern use a second mark length, and a second combination of the first pattern, the second pattern and the third pattern where the first pattern uses the second mark length and the second pattern and the third pattern use the first mark length.

8. Record carrier comprising marks for recording information and a record carrier identification recorded using at least a first pattern comprising at least one mark and a second pattern comprising at least one mark, wherein the first pattern and the second pattern are located such that marks of the second pattern can be read simultaneous together with marks of the first pattern by a single read-out spot; and the first pattern is located in a first track and the second pattern is located in a second track directly adjacent to the first track; and the record carrier identification comprises a third pattern and the third pattern is located on a third track directly adjacent to the first track; and the first pattern and the second pattern and the third pattern are aligned in a direction perpendicular to a reading direction; and the second pattern and the third pattern are identical; and the marks are length modulated and the first pattern uses a first mark length and the second pattern and the third pattern use a second mark length different from the first mark length, wherein the record carrier identification is recorded using a first combination of the first pattern, the second pattern and the third pattern, where the first pattern uses the first mark length and the second pattern and the third pattern uses the second mark length, and a second combination of the first pattern, the second pattern and the third pattern where the first pattern uses a second mark length and the second pattern and the third pattern uses the first mark length.

9. Playback device comprising a read-out means for retrieving marks recorded on a record carrier and a record carrier identification detection means, wherein; and the read-out means is arranged to project the optical spot on a first track and a second adjacent track and a third adjacent track simultaneously, covering a section of the first pattern located on the first track and a section of the second pattern located on the second track and a section of a third pattern on the third track; and the record carrier identification retrieval means is arranged to retrieve the record carrier identification from a combination of the first pattern and the second pattern and the third pattern occurring adjacently where the second pattern and the third pattern are identical.

10. Playback device comprising a read-out means for retrieving marks recorded on a record carrier and a record carrier identification detection means, wherein; and the read-out means is arranged to project the optical spot on a first track and a second adjacent track and a third adjacent track simultaneously, covering a section of the first pattern located on the first track and a section of the second pattern located on the second track and a section of the third pattern on the third track; and the record carrier identification retrieval means is arranged to retrieve the record carrier identification from a first combination of the first pattern, the second pattern and the third pattern, where the first pattern uses a first mark length and the second pattern and the third pattern use a second mark length, and a second combination of the first pattern, the second pattern and the third pattern where the first pattern uses the second mark length and the second pattern and the third pattern use the first mark length.

* * * * *